US009952915B2

United States Patent
Nano et al.

(10) Patent No.: US 9,952,915 B2
(45) Date of Patent: Apr. 24, 2018

(54) EVENT PROCESSING DEVELOPMENT ENVIRONMENT

(71) Applicant: Microsoft Technology Licensing, LLC, Redmond, WA (US)

(72) Inventors: Olivier Nano, Haar (DE); Ivo Jose Garcia Dos Santos, Munich (DE); Dirk Siemer, Munich (DE); Laurent Bussard, Illkirch (FR); Clemens A. Szyperski, Bellevue, WA (US); Ziv Kasperski, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 14/660,291

(22) Filed: Mar. 17, 2015

(65) Prior Publication Data

US 2016/0132368 A1    May 12, 2016

Related U.S. Application Data

(60) Provisional application No. 62/076,318, filed on Nov. 6, 2014.

(51) Int. Cl.
*G06F 9/44* (2006.01)
*G06F 9/45* (2006.01)
(Continued)

(52) U.S. Cl.
CPC ............... *G06F 9/542* (2013.01); *G06F 8/30* (2013.01); *G06F 8/41* (2013.01); *G06F 8/42* (2013.01);
(Continued)

(58) Field of Classification Search
None
See application file for complete search history.

(56) References Cited

U.S. PATENT DOCUMENTS 6,625,804 B1    9/2003    Ringseth et al.
6,895,578 B1    5/2005    Kolawa et al.
(Continued)

OTHER PUBLICATIONS

"International Preliminary Report on Patentability Issued in PCT Application No. PCT/US2015/058696", dated Mar. 15, 2017, 6 Pages.
(Continued)

*Primary Examiner* — Insun Kang
(74) *Attorney, Agent, or Firm* — Shook, Hardy & Bacon L.L.P.

(57) ABSTRACT

Embodiments described herein are directed to methods, and systems for generating event processing language code in a development environment using an event processing compiler. A query in event processing language is received in a development environment. The query can be associated with sample data from input files or an input data source. An event processing compiler compiles the query, where the compiler transforms the query from event processing language code to a development environment script language code. In particular, the event processing language code transforms the code based on event processing attributes that are intricately aligned in syntax and semantic between the event processing language and the development environment script language. The query as a development environment script is executed using sample data. Executing the query generates output comprising final results data, intermediate results data, and provides for display warnings when mismatches exist between the results data and output specifications.

19 Claims, 6 Drawing Sheets

(51) Int. Cl.
G06F 9/54 (2006.01)
G06F 17/30 (2006.01)
G06F 9/445 (2018.01)
G06F 9/455 (2018.01)

(52) U.S. Cl.
CPC .............. *G06F 8/436* (2013.01); *G06F 9/445* (2013.01); *G06F 17/30864* (2013.01); *G06F 9/45529* (2013.01)

(56) References Cited

U.S. PATENT DOCUMENTS

| | | | | |
|---|---|---|---|---|
| 8,185,877 | B1* | 5/2012 | Colcord | G06F 9/44 717/124 |
| 8,566,793 | B2 | 10/2013 | Ahadian et al. | |
| 2005/0229154 | A1* | 10/2005 | Hiew | G06F 8/34 717/110 |
| 2008/0040722 | A1* | 2/2008 | Kelem | G06F 15/7867 718/104 |
| 2008/0066052 | A1* | 3/2008 | Wolfram | G06F 8/30 717/109 |
| 2008/0270989 | A1* | 10/2008 | Ahadian | G06F 8/33 717/126 |
| 2010/0031167 | A1 | 2/2010 | Roytman | |
| 2011/0196891 | A1 | 8/2011 | de Castro Alves et al. | |
| 2011/0264754 | A1 | 10/2011 | Gidugu | |
| 2012/0089964 | A1* | 4/2012 | Sawano | G06F 11/3684 717/124 |
| 2012/0246186 | A1* | 9/2012 | Kennedy | G06F 11/3664 707/763 |
| 2012/0324422 | A1 | 12/2012 | Chartier et al. | |
| 2013/0117272 | A1* | 5/2013 | Barga | G06F 17/30551 707/741 |
| 2013/0152043 | A1* | 6/2013 | Kuzmin | G06F 8/72 717/110 |
| 2013/0191815 | A1* | 7/2013 | Davis | G06F 9/45508 717/129 |
| 2013/0227531 | A1* | 8/2013 | Vijayaraghavan | G06F 11/3624 717/130 |
| 2014/0095503 | A1 | 4/2014 | Branson et al. | |
| 2014/0109061 | A1 | 4/2014 | Gibbens et al. | |
| 2015/0149400 | A1* | 5/2015 | Werner | G06F 11/3476 707/600 |
| 2016/0062870 | A1* | 3/2016 | Menahem | G06F 11/362 717/125 |

OTHER PUBLICATIONS

"International Search Report & Written Opinion Issued in PCT Application No. PCT/US2015/058696", dated Dec. 23, 2015, 10 Pages.
"BigQuery Browser Tool Quickstart", Retrieved on: Oct. 7, 2014, Available at: https://cloud.google.com/bigquery/browser-tool-quickstart.
"Debugging JavaScript", Published on: Aug. 15, 2014, Available at: https://developer.chrome.com/devtools/docs/javascript-debugging#liveedit.
"Amazon Redshift Getting Started Guide", Published on: Dec. 1, 2012, Available at: http://docs.aws.amazon.com/redshift/latest/gsg/redshift-gsg.pdf.
"Transact-SQL Debugger Guide", Retrieved on: Oct. 7, 2014, Available at: http://msdn.microsoft.com/en-IN/library/cc645997.aspx.
"SQL Query Builder Introduction", Published on: Mar. 2009, Available at: www.eclipse.org/community/training/webinars/090305_DTP_Webinar.pdf.
Szegedi, Istvan, "Intro to Google BigQuery Introduction", Published on: Jul. 22, 2012, Available at: http://architects.dzone.com/articles/google-bigquery.
"The IBM Data Discovery and Query Builder for Healthcare and Life Sciences", Retrieved on: Oct. 7, 2014, Available at: https://publib.boulder.ibm.com/infocenter/eserver/v1r2/topic/ddqb/LFS00049-USEN-00.pdf.
"Teradata SQL Assistant/Web Edition", Published on: Aug. 2008, Available at: http://tunweb.teradata.ws/tunstudent/tunhelp/sql_assistant_web_user_guide.pdf.
Magar, et al., "Web-Based Query Builder", In International Journal on Computer Science and Engineering, vol. 4, No. 4, Apr. 2012, 4 pages.
Sheldon, Robert, "Debugging Data Flow in SQL Server Integration Services", Published on: Sep. 13, 2011, Available at: https://www.simple-talk.com/sql/ssis/debugging-data-flow-in-sql-server-integration-services/.
"Second Written Opinion Issued in PCT Application No. PCT/US2015/058696", dated Oct. 19, 2016, 5 Pages.

* cited by examiner

EVENT PROCESSING DEVELOPMENT ENVIRONMENT

CROSS-REFERENCE TO RELATED APPLICATIONS

This application claims priority to U.S. Provisional Application Ser. No. 62/076,318, filed Nov. 6, 2014, entitled "EVENT PROCESSING DEVELOPMENT ENVIRONMENT," which is incorporated herein by reference in its entirety.

BACKGROUND

Event processing refers to tracking and analyzing streams of information to derive a conclusion from them. Streams of information may be, in particular, about events. Event processing also includes event processing that combines data from multiple data sources to infer events or patterns that suggest more complicated circumstances. As such, event processing can facilitate identifying meaningful events and respond to them as quickly as possible.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to methods, systems, and computer storage media for generating event processing language code in a development environment using an event processing compiler. A query in event processing language code is received in a development environment. The query can be associated with sample data from input files or an input data source. An event processing compiler compiles the query, where the compiler transforms the query from event processing language code to a development environment script language code. In particular, the event processing language code transforms the code based on event processing attributes that are intricately aligned in syntax and semantic between the event processing language and the development environment script. The query as a development environment script is executed against the sample data. Executing the query can generate output comprising final results data, intermediate results data, and provides for display warnings when a mismatch exists between the results data and output specifications.

BRIEF DESCRIPTION OF THE DRAWINGS

The present invention is described in detail below with reference to the attached drawing figures, wherein.

DETAILED DESCRIPTION

Figure 1:
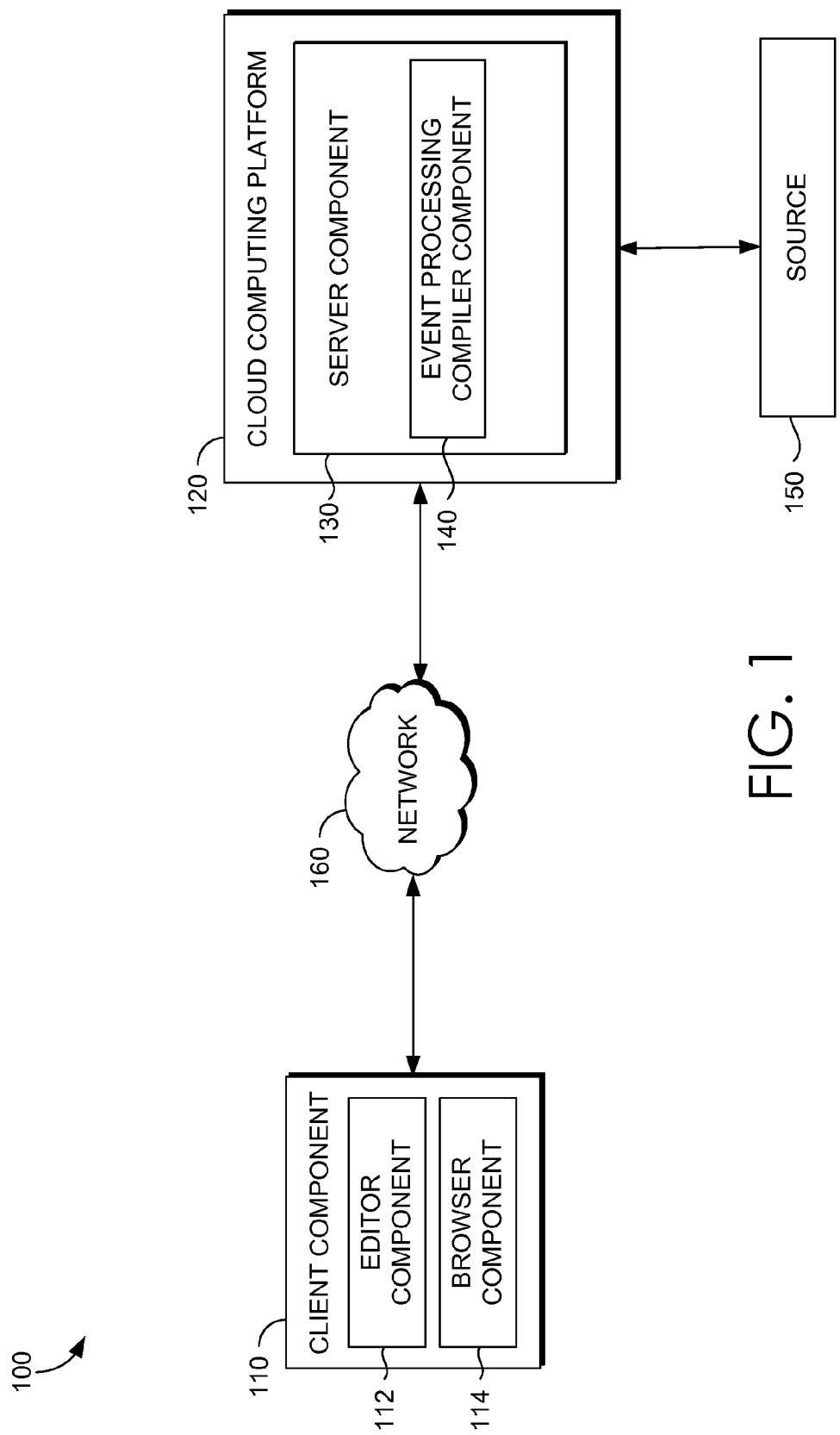
FIG. 1 is a block diagram of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments are described with reference to a server-client architecture supported by a cloud computing platform, and further by way of example, the development environment is a web browser development environment with the event processing compiler located on the server. However, the methods described herein can be performed in different types of operating environments having alternate configurations of the functional components described herein. As such, the embodiments described herein are merely exemplary, and it is contemplated that the techniques may be extended to other implementation contexts.

A software development cycle generally refers to the process of planning, creating, testing, and deploying of an information system. A software development cycle can be used to develop event processing systems based on event processing language code. Event processing refers to tracking and analyzing streams of information to derive a conclusion from them. Streams of information may be, in particular, about events occurring over time. Event processing also includes event processing that combines data from multiple data sources to infer events or patterns that suggest more complicated circumstances. As such, event processing can facilitate identifying meaningful events (e.g., opportunities or threats) and respond to them as quickly as possible. Events may generally include sales leads, orders or customer service call, new items, text messages, social media posts, stock market feeds, traffic reports, weather reports, internet of things data, or other kinds of data.

An event processing system can operate with one or more input streams based on received event processing language queries. An event processing language query can be coded in a SQL-like language (e.g., SQL dialect) with, by way of example, SELECT, FROM, WHERE, GROUP BY, HAVING, and ORDER BY clauses. Streams can replace tables as the source data with events replacing rows as the basic unit of data. Since events are composed of data, the SQL concepts of correlation through joins, filtering through subqueries, and aggregation through grouping may be effectively leveraged.

Developing software systems, including event processing systems, can be done using development environments. A development environment can refer to an interface that provides comprehensive facilities to computer programmers for software development. However, the specific attributes of event processing can make generating a flexible and integrated development environment difficult. In particular, event processing language code does not readily translate into development environment functionality, especially when attempting to maintain the capacity for the code to be executed in a production event processing systems.

By way of example, specific attributes of event processing that have to be considered, which are not implicated in development environments of other languages, can include an event being defined as a change of a state, when a measurement exceeds a predefined threshold of time, temperature, or other value; or events may occur as a stream of events that are analyzed to detect patterns within the event streams. In this regard, certain considerations have to be made when providing a development environment for event processing because of the distinguishing attributes of event processing systems from other types of systems and corresponding coding languages.

Conventional methods for developing event processing language code and systems include running sample data in test environments, for example, on a cluster service via a server that receives a test deployment having event processing language code for testing event processing systems. As such, each attempt to test changes to code may take several minutes, in that, the code is compiled and then deployed to the cluster service. These steps can, in the aggregate, lead to considerable amount of lost time.

In another conventional testing scenario, selecting different processing streams further necessitates deploying the code again into a test environment upon compilation before results are generated. Another constraint can further include limits on the capacity to understand internal occurrences during the generation of output results. For example, a test deployment may generate output results but lack the functionality to trace through the test deployment event processing language code and results data sets or a way of querying in-between results data sets.

Accordingly, embodiments of the present invention provide simple and efficient methods and systems for generating event processing language code in development environments using event processing compilers. At a high level, a user or developer can use a development environment to generate (author) and test (debug) event processing language code, where the event processing language code is compiled into development environment scripting language code ("scripting language code") to facilitate providing event processing development environment assistance ("environment assistance") such as, coding automation, syntax and error highlighting, warnings, intelligent code completion, and troubleshooting functionality in the development environment. By way of example, the development environment can provide graphical visualization of inputs, intermediate results, and output. Specifically, graphical visualizations for a plot of temperature inputs can visually indicate to a user that a 10 second interval is needed, after crossing a threshold, to trigger an alarm because some intermediate operator (e.g., a window) can add latency. As such, temporal aspects of executing event processing queries can be visually indicated, which can be otherwise difficult to illustrate in tabular representations. Other variations and combinations of development environment assistance functionality are contemplated with embodiments described herein.

In addition, event processing language code can be validated with a corresponding scripting language code, such that, errors that can occur in a production environment are detected in the development environment. The validation further confirms that when a query in event processing language code is executed on a production system, the query yields the same results as in the development environment. In this regard, embodiments described herein support a development environment based on: authoring workflow, a debugging workflow, and a validation workflow.

The development environment authoring workflow, debugging workflow, and validation workflow can be dependent on operations performed at an event processing compiler. The event processing compiler transforms source code written in event processing language into a scripting language code while accommodating the specific attributes of event processing. Transforming the event processing language code to script language code can be based on event processing attributes that are intricately aligned in syntax and semantic between the event processing language and the development environment script.

For example, event processing includes low and deterministic latencies while handling high rates of streaming input data. Other exemplary event processing attributes can include end-to-end analysis over events flowing from heterogeneous information sources to persistent knowledge repositories; integrated pattern detection over real-time and historical events; and latency and throughput metrics. In this regard, the event processing compiler encounters challenges that are quite different from those faced by more-traditional compilers, which tend to focus on non-temporal and non-streaming data.

As such, the event processing compiler functionality can be configured to accommodate the event processing attributes in event processing language code compilation. Thus, embodiments described herein include the transformation of queries written in event processing language processed, using an event processing compiler, to a scripting language to provide development and testing in a development environment and to another target language for production environment. The clear semantics of the query guarantees that both executions (debugging and production) produce the same output from identical inputs.

In operation, by way of example, a user can author and edit a query in a web browser development environment ("browser") that provides environment assistance, such as, syntax and error highlighting and intelligent code completion. The query can be written in an event processing language code with the environment assistance provided for event processing language coding via an editor program. The editor program can color highlight errors, show error messages, and indicate entities to support intelligent code completion. The query can be compiled using an event processing compiler and executed against sample data presented as an input file or extracted directly form input data source.

The event processing compiler can specifically support validation of the event processing language code in order to confirm that executing the event processing language code on a production system can yield the same results as in the development environment. The event processing compiler can communicate entity errors and validation errors associated within event processing language code. The browser can further display the output of the query which can include summary information, errors, and final results data and intermediate results data for queries executed against the sample data.

Additionally, during debugging, a query might be generated with a breakpoint to facilitate inspecting inputs and intermediate results. If a user has placed a breakpoint in a query, executing the query can be stopped at the breakpoint to provide intermediate results and the inputs up to the breakpoint. The intermediate results and inputs can be accessible using an editor program. In addition, a custom query can be run at any identified time, and additional queries can be run on input tables, intermediate tables and intermediate results, for troubleshooting purposes. By way of example, when a user runs a custom query on the input tables or intermediate results a second compile operation can be performed on the query, and the new query is executed against the input tables and intermediate results to generate results.

In embodiments, the user may change a source table value and continue the query from an indicated breakpoint in the query, changes to a source table value can be handled as though a new source is identified and the query, without compilation, is executed on the new source. The user can also change an intermediate table value and continue the query from the breakpoint, changes to an intermediate table value can be handled as though the intermediate table is converted to a source table. As such, computations of the intermediate table can be removed from an "in-memory" query and compile the query getting a new query to be executed.

Further, input files can be stored and retrieved specifically as test cases. Test cases can include the input files and corresponding results of the input files. In this regard, a user can execute additional queries, such as optimized or amended queries, on input files of the test cases and validate the new results against the results associated in the test cases. In another embodiment described herein, the results data schema can be validated against output specifications with errors generated when a match with the specification does not exist.

Accordingly, in a first embodiment described herein, one or more computer storage media having computer-executable instructions embodied thereon that, when executed, by one or more processors, cause the one or more processors to perform a method for generating event processing language code in development environments using event processing compilers, is provided. The method includes receiving a query in a development environment. The query comprises event processing language code. The method also includes compiling the query using an event processing compiler. Compiling the query transforms the query from event processing language code to a development environment script language code based at least in part on event processing attributes. The method further includes executing the query as a development environment script using sample data, where executing the query generates output comprising results data based on the sample data.

In a second embodiment described herein, a computer-implemented method for generating event processing language code in development environments using event processing compilers, is provided. The method includes receiving a query in a browser development environment. The query comprises event processing language code. The method also includes compiling the query using an event processing compiler. Compiling the event processing language transforms the query in the event processing language code to a development environment script based on event processing specific attributes. The method further includes determining that the query comprises a breakpoint. The breakpoint is an intermediate point prior to executing the query wholly. The method includes executing the development environment script up to a breakpoint in the query. The development environment script generates intermediate tables and intermediate results data based on sample data.

In a third embodiment described herein, a computer system for generating event processing language code in development environments using event processing compilers, is provided. The system includes a client component configured for: receiving a query in a development environment, where the query comprises event processing language code; and executing the query as a development environment script using sample data, where executing the query generates output comprising results data based on the sample data. The system also includes an event processing compiler component configured for: compiling the query using an event processing compiler, where compiling the query transforms the query from event processing language code to a development environment script language code based at least in part on event processing attributes.

Turning now to FIG. 1, a block diagram depicting an event processing development environment system 100 ("development environment system") in an operating environment suitable for use in implementing embodiments described herein is provided. Generally, the development environment system 100 may be used for, among other things, generating event processing language code. A user or developer can use the development environment system 100 to author code and debug event processing language code. The event processing language code is compiled into scripting language code; the scripting language code facilitates providing development environment assistance in the development environment for the event processing language code.

Among other components not shown, the development environment system 100 may generally include a client component 110 having an editor component 112, and a browser component 114, a cloud computing platform 120 having a server component 130 comprising an event processing compiler component 140, a source 150 (e.g., data source) all in communication with each other using a network 160. The network 160 may include, without limitation, one or more local area networks (LANs) and/or wide area networks (WANs). Such networking environments are commonplace in offices, enterprise-wide computer networks, intranets and the Internet.

In some embodiments, one or more of the illustrated components and/or modules may be implemented as stand-alone applications. In further embodiments, one or more of the illustrated components and/or modules may be implemented via a computing device, as an Internet-based service, and/or as a module within the client component 110 and the cloud computing platform 120. It will be understood by those of ordinary skill in the art that the components and modules illustrated in FIG. 1 are exemplary in nature and in number and should not be construed as limiting.

Any number of components and/or modules may be employed to achieve the functionality described herein. For example, any number of client components, cloud computing platforms and components thereof and networks may be employed in the development environment system 100 within the scope of embodiments hereof. Each may comprise a single device/interface or multiple devices/interfaces cooperating in the development environment system 100. For instance, multiple devices and/or modules arranged in a distributed environment may collectively provide the server component described herein. The phrase "application" or "service" as used herein may broadly refer to any software, or portions of software, that run on top of, or access storage locations within, a computing device and/or multiple computing devices, such as multiple computing devices in a data center.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the development environment system 100, may be carried out by a processor executing instructions stored in memory.

Turning now to the various components that may be included in the development environment system 100, the client component 110 can be any type of computing device 600 described below with reference to FIG. 6, for example. The client component 110 implements the editor component 112 and the browser component 114.

The editor component 112 is responsible providing an interface for editing event processing language code with functionality supported in embodiments described herein. The editor component can implemented as a text editor program designed for editing event processing language code of a user, such as a programmer. The editor can include features that are specifically designed to support editing event processing language code with development environment assistance, such as, coding automation and troubleshooting functionality in the development environment. The editor can provide a convenient way to enter event processing language code for processing at an event processing compiler, according to embodiments described herein. The editor can be a standalone application or it may also be built into a development environment, such as, an integrated development environment or a web browser development environment.

The client component 110 can further support a browser component 114 that is responsible for providing a communication interface for the development environment system 100. The browser component 114 can refer to a software application for retrieving, presenting and traversing resources using the World Wide Web. The browser component can also be referred to as a web browser development environment. The browser may be implemented in the client component 110, such that, messages are communicated, based on event processing language code in the editor component 112, to an event processing compiler, to support development of event processing systems.

The browser component 114 can be configured for requesting via the client component 110 event processing development environment specifications ("environment specifications"). Environment specifications comprise explicit set of requirement to be satisfied when executing the event processing query. Examples of environment specifications include language specifications, input specifications, and output specifications. Language specification generally refers to artifacts defining elements of the language. In particular, explicit definitions of syntax and semantics of the language. Syntax and semantics can be specified in a formal grammar. As discussed in more detail below, the syntax and semantics are associated with event processing attributes and are intricately aligned between the event processing language code and the scripting code for validation of the code in the development environment and production environment. New language specification elements can be added as the language develops, as such, the browser component 114 can receive the most up to date language specifications that are further compatible with environment assistance functionality.

Input specifications can define the nature or input requirements of an input data (e.g., input file or data source). In embodiments, the input specification can specifically indicate whether an input is a data stream or reference data, such that, event processing accommodates the specific type of input. Output specification also similarly defines the nature or output requirements of output data. In embodiments, output requirements can specifically indicate the schema of database storage or expected output schema for results data. Other variations and combinations of language specifications, input specifications, and output specifications are contemplated with embodiments of the present invention.

The cloud computing platform 120 is configured to support a server component 130 having an event processing compiler component 140 in a distributed system. The cloud computing platform 120 may span wide geographic locations, including countries and continents. The service or application components (e.g., tenant infrastructure or tenancy) of the cloud computing platform may include nodes (e.g., computing devices, processing units, or blades in a server rack) that are allocated to run one or more portions of a tenant's services and applications. When more than one application is being supported by the nodes, the nodes may be partitioned into virtual machines or physical machines. The virtual machines or physical machines run each application concurrently in individualized computing environments.

The computing environments support the resources and/or operating systems specific to each application. Further, each application may be divided into functional portions, such that, each functional portion is able to run on a separate virtual machine or physical machine. The cloud computing platform can rely on shared resources between the different components to maximize effectiveness of operations.

The cloud computing platform can support servers (e.g., server component 130) that implement a service or application offered by a provider of the cloud computing platform 120. In this regard, the cloud computing platform 120 may be configured to support event processing development environments implemented using in the cloud computing platform. Other types of operating environments are contemplated with embodiments described herein.

With continued reference to FIG. 1, the server component 130 includes an event processing compiler component 140. The server component 130 is responsible for receiving requests and facilitating the communication of data associated with particular requests. The server component 130 may manage requested data (e.g., environment specifications) and the server component 130 can also retrieve requested data from another location (e.g., sample data from input source). The server component 130 can further provide storage for data (e.g., test cases). A user can request that a test case be stored, such that, the test case can be retrieved for executing additional queries to compare results data. In embodiments, the test cases can be stored with corresponding input files and test results so that new test results based on new queries (e.g., optimized or amended queries) can be compared to the old test results. It is contemplated that the old test results may not be stored but actually generated based on re-executing the original query against the input files. Test cases can run in the background during processing of new queries such that the user receives hints that the test cases are passing or failing with changes to the queries. In embodiments, given that queries evolve over time, a determination whether a test case passed or failed can be done using a fuzzy matching mechanism which may produce warning results. For example, warnings can be based on columns being added or removed; however, the columns that existed in both the previous query and the new query should have the same results.

The server component 130 can communicate with an external storage, source 150, to retrieve data (e.g., sample data). The source 150 can be indicated in the event processing language as a location of data that can be aggregated to generate sample data. In embodiments, data from the source can be selectively identified based on a predefined criteria or algorithm to capture data to compose the sample data. The source 150 can be a data stream or reference data, or any type of data used in event processing systems. It is contemplated that a determination can be made at the client component 110 whether sample data for a query is based on input files provided by a user or data from source 150.

The event processing compiler component 140 is generally responsible for transforming event processing language code to a scripting language format, while accommodating the attributes of event processing. In an authoring workflow, the event processing compiler component 140 can receive a query in event processing language code and transform the query to a development script language code. The transformation process can include syntax and semantic validation between event processing language code and scripting language code based on attributes of event processing. For example, event processing can include data streams of temporal data. The data streams having the temporal data are factors during a validation workflow when the compiler transforms the query in event processing language code.

As such, the syntax and semantic are validated, such that, not only are syntax elements (e.g., keywords, object names, delimiters) and semantic elements (e.g., entities, data object, host variables, data types) are validated, but also syntax elements and semantic elements are particularly validated in the context of event processing attributes in an event processing system. Any validation errors identified have to further be correctly transformed between the languages upon executing the query to display via the browser to fix errors in the browser development environment. Moreover, validation further confirms that the query as tested in the development environment would execute the same way and yield the same results in a production environment.

In a debugging workflow, a compilation of a query in event processing language code also occurs as described above, and results data can be generated for the query. A debugging workflow can further generate intermediate results data comprising intermediate tables. By way of example, for debugging purposes, a change may be made to a value in the intermediate table and then a subsequent query executed on the table. In this case, the event processing compiler compiles the query corresponding to the intermediate table with the changed value and executes the query against that data. It is important to note that the above described operations occur seamlessly while a user codes and debugs in a development environment via a browser.

Figure 2:
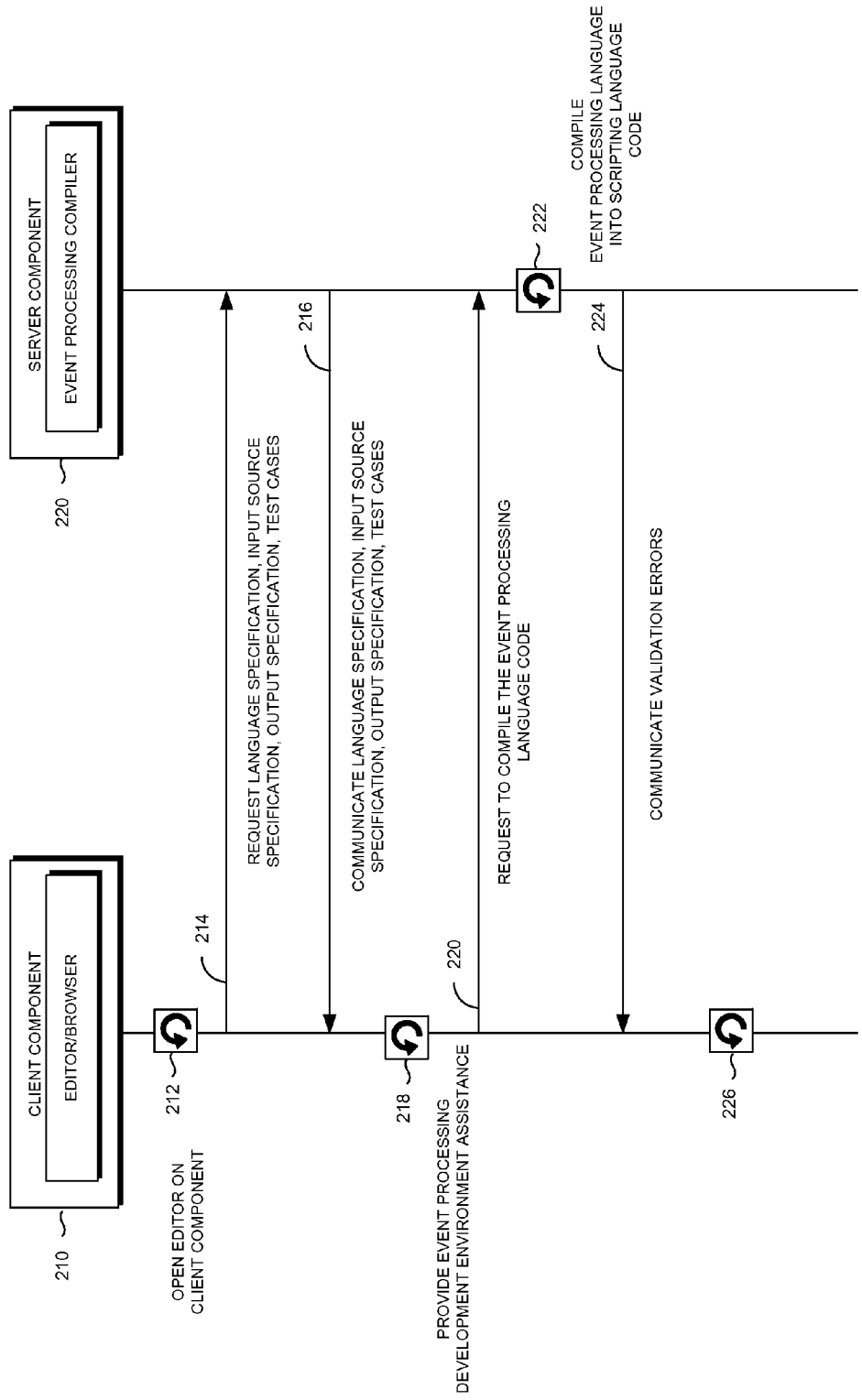
FIG. 2 is a flow diagram showing an exemplary method for authoring event processing language code in development environments using event processing compilers, in accordance with embodiments described herein.

Turning now to FIG. 2, a schematic that illustrates an exemplary authoring workflow for generating event processing language code in a development environment using an event processing compiler is provided. The schematic includes a client component 210 having an editor and browser and a server component 220 having an event processing compiler, all in accordance with embodiments described herein. The server component 220 can support a service application which implements an event processing development environment via the cloud computing platform (not shown).

At 212, a user or developer can open the editor on the client component. The editor is designed for editing event processing language code with development environment assistance as described herein. In embodiments, the editor is implemented using a browser. It is contemplated that the editor can also be implemented as an integrated development environment or any other interface development environment.

At 214, the browser via the client component 210 can request from the server component 220 environment specifications. Event processing development environment specifications can include language specifications, input specifications, and output specifications as described above. At 214, the client component 210 can also request test cases. Test cases can be specifically associated with input files of the user, where the test cases were saved and can now be retrieved to facilitate authoring and debugging. In particular, when the schema of input(s) is known, the editing experience (syntax and error highlighting and intelligent code completion) becomes more precise. At 216, the language specification, input specification, output specification, and test cases can be communicated to the client component 210 for use at the browser and editor.

At 218, event processing development environment assistance ("environment assistance") is provided via the browser for editing the event processing language code. For example, existing event processing language code and or event processing language code actively being entered by a user can be evaluated to provide environment assistance. Environment assistance can include warnings, syntax and error highlighting and color coding, and intelligent code completion. Query execution on test cases, and indications of passes and fails can also be communicated as environment assistance features via the development environment.

At 220, a request to compile the event processing language code is communicated to the event processing compiler at the server component 220. The request can include communicating the event processing language code over to the server component 220. At 222, the event processing compiler transforms the event processing language code into a scripting language code while accommodating the attributes of event processing. Syntax and semantic elements are particularly validated in the context of event processing attributes in an event processing system. Any validation errors identified have to further be correctly transformed between the languages upon compiling the query to display via the browser to fix errors in the browser development environment. Moreover validation further confirms that the query as tested in the development environment would execute the same way or yield the same results in a production environment where no transformation of the event processing language code occurs.

At 224, any validation errors are communicated to the client component, where the browser displays the validation errors. In particular, validation errors can further include entity errors associated with the compiled query. At 226, the user can, using the editor, address any validation errors. In addition, environment assistance can be made available through the browser and editor, for example, syntax and error highlighting and intelligent code completion when addressing the errors.

Figure 3:
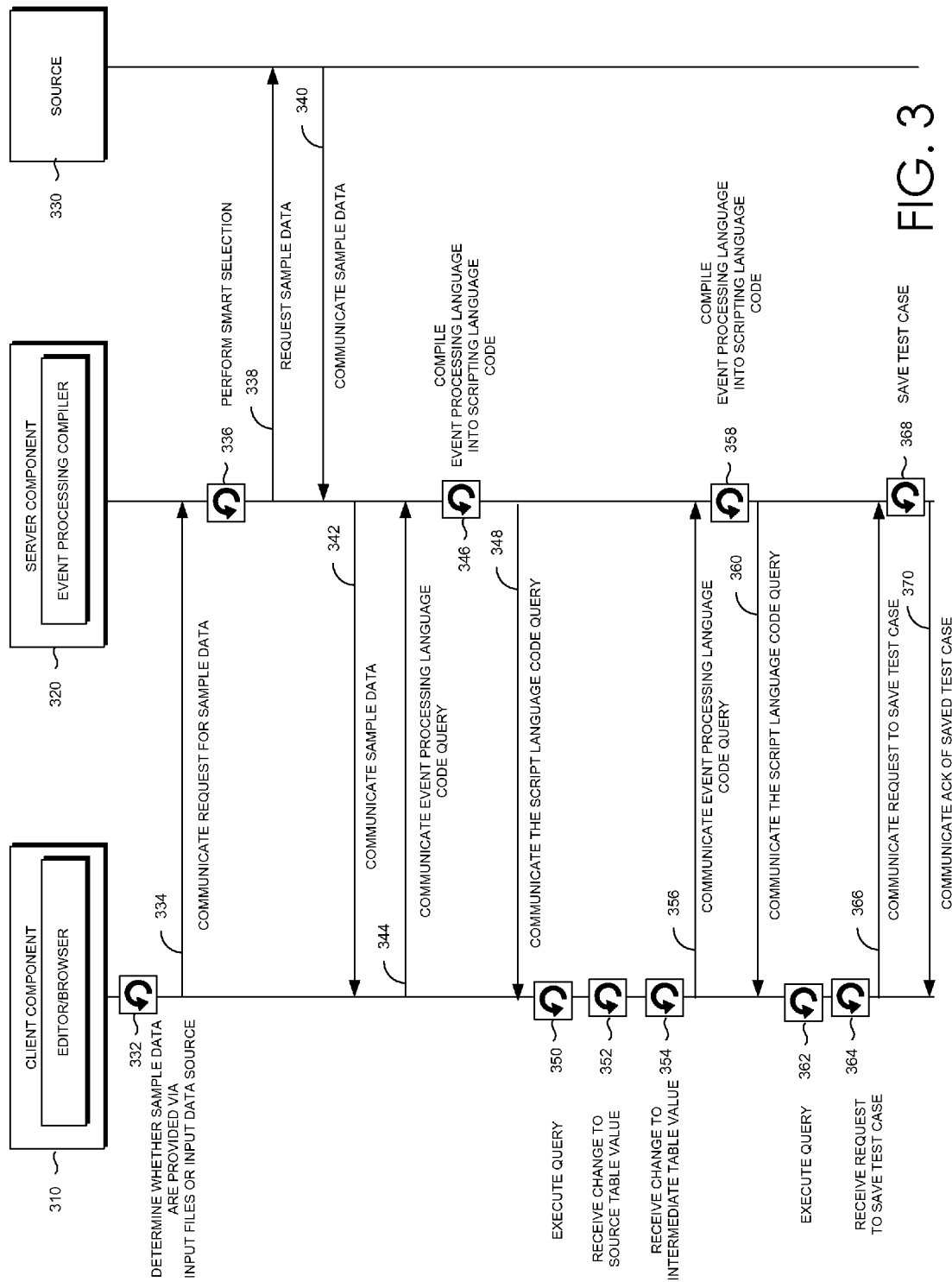
FIG. 3 is a flow diagram showing an exemplary method for debugging event processing language code in development environments using event processing compilers, in accordance with embodiments described herein.

Turning now to FIG. 3, a schematic that illustrates an exemplary debugging workflow for generating event processing language code in development environments using event processing compilers is provided. The schematic includes a client component 310 having an editor and browser, a server component 320 having an event processing compiler, and a source component 330, all in accordance with embodiments described herein. The server component 220 can support a service application which implements an event processing development environment via the cloud computing platform (not shown).

At 332, a determination can be made whether the sample data are provided using input files or an input data source (e.g. source 320). The determination can be made based on a user indication of a selected option of the location of the sample data. Other methods of determining whether input files or an input data source is utilized for retrieving the sample data are contemplated with embodiments described herein. When the option is to retrieve sample data from the source 330, operations (334 to 342), as discussed below, can be performed to obtain the sample data from the source 330.

At 334, when an input data source is indicated, a request for sample data can be communicated to the server component 320. It is contemplated at 336 that the server component can implement a smart selection algorithm or operation to selectively choose particular events from the source 330 to generate the sample data. The server component 320 can then request 338 the sample data from the source 330 and can communicate 340 the sample data from the source 330. The source 330 can be an internal or external data source which may specifically be a data stream or reference data. At 342, the server component 320 can communicate the sample data to the client component 310.

At 344, in cases where the sample data is retrieved from input files, after 332, the event processing language code query is communicated. Also, after sample data is retrieved from source 330, then upon receiving the sample data, the query is communicated at 344. Moreover, whether the sample data are input files or an input data source, the input is controlled such that debugging can include reproducing executions in a debugging workflow to compare the evolution of outputs when slightly changing the query (or the inputs). At 346, the query is compiled; the query in event processing language code is transformed to the query development language script. The transformation process can include syntax and semantic validation between event processing language code and scripting language based on attributes of event processing in an event processing system. At 348, the query in script language code is communicated to the client component 310, such that, the browser executes the query.

At 350, the browser can execute the query to generate intermediate results and final results data as output. The browser can also display the final output. At this point, a determination can further be made whether the results data, intermediate or final, meet the output specification associated with the query. The browser can communicate a warning when a match does not exist between the results data and the output specification.

With continued reference to FIG. 3, the debugging workflow can further include changing a value in the sample data tables (source table) or changing a value in the intermediate table created for the corresponding intermediate results. It is contemplated that a query can include a breakpoint. The query executes up to the breakpoint and then stops to allow for troubleshooting using source tables and intermediate tables. As such, when a breakpoint exists, at 350 the browser can execute the query to generate intermediate results up to the breakpoint. It is however contemplated that a query with a breakpoint can be executed in its entirety as a computing process, but exposed to the user up to the breakpoint when a breakpoint exists in the query. The browser can display the source table and intermediate results for all sources with statements up to the breakpoint location.

As such, when a breakpoint exists, an indication 352 of a change in a source table can be received at the client component 310. When the change indication is received, the query in the script language code can be executed based on the source table with the changed value. It is contemplated that additional queries may be generated and executed from the portion where the breakpoint ended. Executing the query generates intermediate results and a final results output and the browser can display the final output with warning if a mismatch exists between the results and the output specification.

An indication 354 of a change in an intermediate table can be received, in addition or alternately. In this case, the intermediate table with the changed value constructively becomes a source table. As such, the query is communicated 356 to the server component 320 event processing compiler to compile the query with the intermediate table as the source table. In other words, the transformation of the intermediate table to a source table results in recompiling the query. The query upon compilation 358 based on methods described herein, can be communicated 360 back to the client component 310. The client component 310 via the browser can execute 362 the query to generate intermediate results and a final results output and the browser can display the final output with warning if a mismatch exists between the results and the output specification.

In embodiments, it is contemplated that a request 364 can be received to save a test case. The test case can include the input files and corresponding results. The new queries can be executed based on the test case to compare the results of the new queries with the results of the test case results. It is contemplated that the test case results can be stored or re-generated during a comparison phase. In operation, the request can be communicated 366 to the server component 320 where the server component saves 368 the test case. An acknowledgment of saving the test case can be communicated 370 from the server component 320 to the client component 310.

Figure 4:
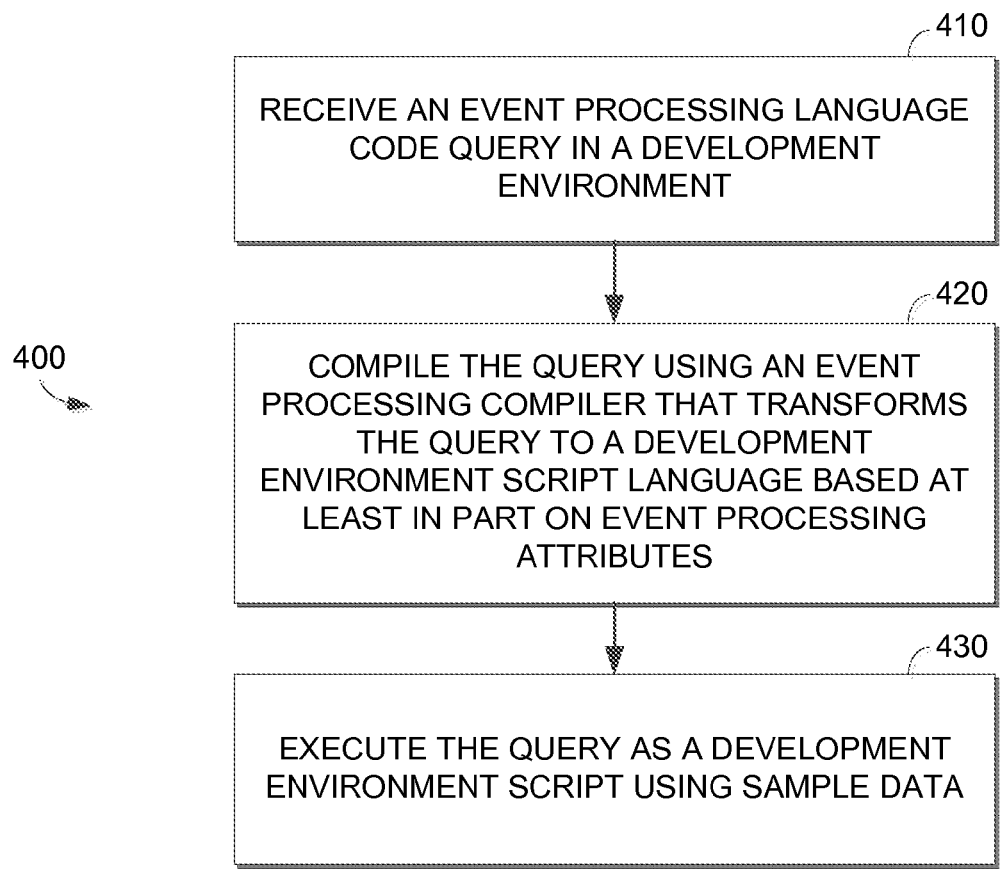
FIG. 4 is a flow diagram showing an exemplary method for generating event processing language code in development environments using event processing compilers, in accordance with embodiments described herein.

Turning now to FIG. 4, a flow diagram that illustrates an exemplary method 400 for generating event processing language code in a development environment using an event processing compiler. At block 410, query is received. The query includes event processing language code. The query can be received in a browser development environment that retrieves environment specifications (e.g., language specifications, input specifications, and output specifications) for support the development environment. The development environment can also support an editor program having a plurality of development assistance functionality comprising warnings, syntax and error highlighting, and intelligent code completion.

At block 420, the query is compiled using an event processing compiler. The event processing complier transforms the query from event processing language code to development environment script language code, based at least in part on event processing attributes. Specifically, compiling the query can include validating the event processing language code with the corresponding development environment script language code. The validation confirms that executing the query in the event processing language code in a production environment yields the same results as in the development environment. Validation can be based on event processing attributes that are intricately aligned in syntax and semantic between the event processing language and the development script language.

At block 430, the query as development environment script is executed using sample data. Executing the query generates output comprising results data based on the sample data. It is contemplated that the sample data can be retrieved from input files or an input source. A determination of whether the sample data is from input files or an input source can be based on an indication from user. Also, the query may be executed upon fixing syntax and semantic errors indicated via the browser display.

Figure 5:
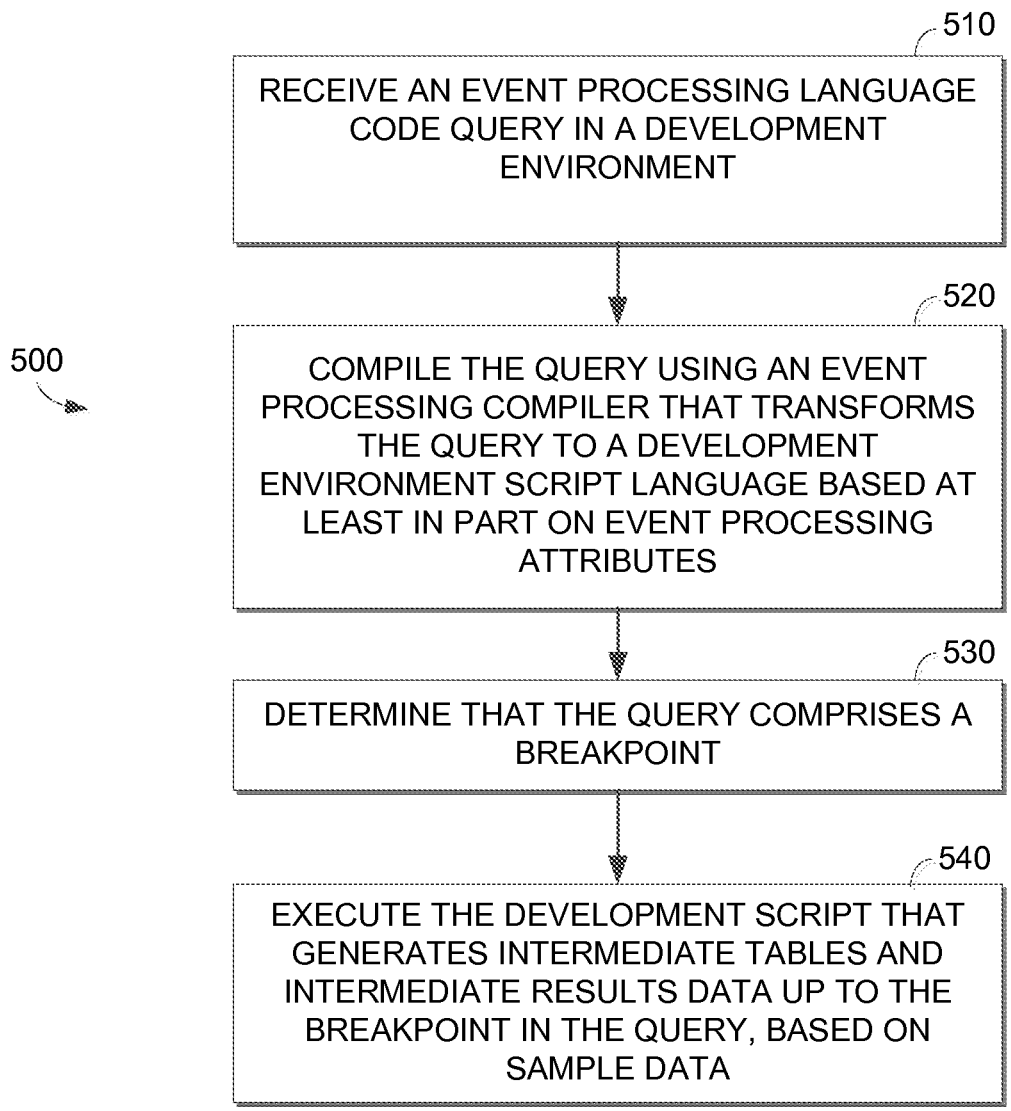
FIG. 5 is a flow chart showing an exemplary method for generating event processing language code in development environments using event processing compilers, in accordance with embodiments described herein.

Turning now to FIG. 5, a flow diagram that illustrates an exemplary method 500 for generating event processing language code in a development environment using an event processing compiler. At block 510, a query is received. The query includes event processing language code. At block 520, the query is compiled using an event processing compiler. The event processing complier transforms the query from event processing language code to development environment script language code, based at least in part on event processing attributes.

At block 530, a determination is made that the query includes a breakpoint. The breakpoint can be an intermediate point prior to executing the query wholly. The break point facilitates inspecting intermediate input and intermediate results for a corresponding query. At block 540, the query as development environment script is executed up to the breakpoint using sample data. Executing the query generates intermediate tables and intermediate results data up to the breakpoint in the query. It is contemplated that an indication can be received to change a value in a source table or an intermediate table. When a value is changed in the source table or the intermediate table an additional query can be executed on the table to generate additional results data.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 6:
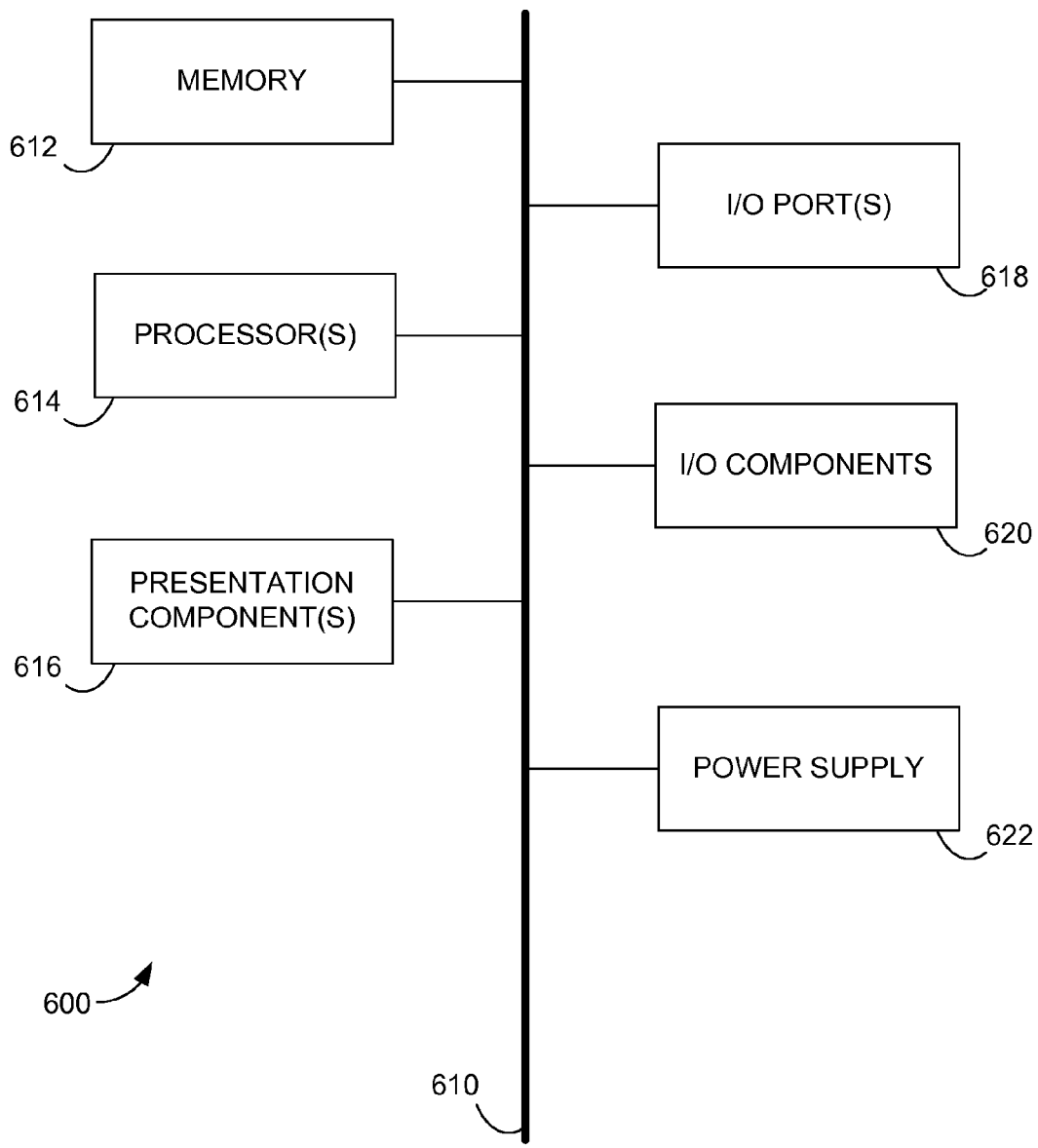
FIG. 6 is a block diagram of an exemplary computing environment suitable for use in implementing embodiments described herein.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 120, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media having computer-executable instructions embodied thereon that, when executed, by one or more processors, cause the one or more processors to perform a method for generating event processing language code in development environments using event processing compilers, the method comprising:
   receiving a query in a development environment, wherein the query comprises event processing language code;
   compiling the query using an event processing compiler, wherein compiling the query transforms the query from the event processing language code to a development environment script language code based at least in part on event processing attributes that are aligned in syntax and semantic between the event processing language code and the development environment script language code, and wherein based on compiling the query, development environment assistance functionality in the development environment of the development environment script language code operates to validate the event processing language code through the development environment script language code; and
   executing the query as the development environment script language code using sample data, wherein executing the query generates output comprising results data based on the sample data.

2. The media of claim 1, wherein the development environment is a browser development environment having environment specifications comprising language specifications, input specifications, and output specification.

3. The media of claim 1, wherein the development environment supports an editor having a plurality of development environment assistance functionality comprising warnings, syntax and error highlighting, and intelligent code completion.

4. The media of claim 1, further comprising: determining whether the sample data is retrieved from input files or an input source.

5. The media of claim 1, wherein compiling the query using the event processing compiler further comprises:
   validating the event processing language code with the corresponding development environment script language code such that executing the query in the event processing language code in a production environment yields the same results as in the development environment.

6. The media of claim 1, wherein an event processing attribute includes a data stream of an event having temporal properties.

7. The media of claim 1, wherein compiling the query using the event processing compiler further comprises:
   identifying syntax errors in the transformation between the event processing language code and the development environment script language code;
   identifying semantic errors in the transformation between the event processing language code and the development environment script language code; and
   providing for display the syntax errors and semantic errors as validation errors, wherein the validation errors are displayed in the development environment, wherein the same syntax errors and semantic errors are yielded when the query is compiled in a production environment.

8. The media of claim 7, further comprising receiving edits to the query in the event processing language code, wherein the edits are received based on the validation errors displayed in the development environment.

9. A computer-implemented method for generating event processing language code in development environments using event processing compilers, the method comprising:
   receiving a query in a browser development environment, wherein the query comprises event processing language code;
   compiling the query using an event processing compiler, wherein compiling the query transforms the query in the event processing language code to a development environment script language code based on event processing attributes that are aligned in syntax and semantic between the event processing language code and the development environment script language code, and wherein based on compiling the query, development environment assistance functionality in the browser development environment of the development environment script language code operates to validate the event processing language code through the development environment script language code;
   determining that the query comprises a breakpoint, wherein the breakpoint is an intermediate point prior to executing the query wholly; and
   executing the development environment script language code up to the breakpoint in the query, wherein the development environment script language code generates at least intermediate tables and intermediate results data based on sample data.

10. The method of claim 9, wherein the breakpoint facilitates inspecting intermediate input and intermediate results for a corresponding query.

11. The method of claim 9, further comprising:
   receiving an indication to change a value in a source table;
   retrieving the query to execute the query on the source table from the breakpoint; and without compiling, executing the development environment script language code from the breakpoint in the query, wherein the development environment script generates final results data.

12. The method of claim 9, further comprising:
receiving an indication to change a value in an intermediate table;
retrieving the query to execute the query on the intermediate table from the breakpoint;
transforming the intermediate table into a source table for the query;
compiling the query, based on the intermediate table as the source table, using the event processing compiler, wherein compiling the event processing language code transforms the query in the event processing language code to the development environment script language code based on event processing attributes; and
executing the development environment script up from the breakpoint in the query, wherein the development environment script generates final results data based on the intermediate table as the source table.

13. The method of claim 9, further comprising:
receiving an indication to save a selected test case; and
saving the selected test case with corresponding input files and result data.

14. The method of claim 13, further comprising:
receiving an indication to retrieve the selected test case; and
retrieving the selected test case with the corresponding input files and result data.

15. A computer system for generating event processing language code in development environments using event processing compilers, the system comprising:
one or more hardware processors and memory storing computer-executable instructions and components embodied thereon that, when executed, by the one or more hardware processors, cause the hardware processors to execute:
a client component configured for:
receiving a query in a development environment, wherein the query comprises event processing language code; and
executing the query as a development environment script language code using sample data, wherein executing the query generates output comprising results data based on the sample data; and
an event processing compiler component configured for:
compiling the query using an event processing compiler, wherein compiling the query transforms the query from the event processing language code to the development environment script language code based at least in part on event processing attributes that are aligned in syntax and semantic between the event processing language code and the development environment script language code, and wherein based on compiling the query, development environment assistance functionality in the development environment of the development environment script language code operates to validate the event processing language code through the development environment script language code.

16. The system of claim 15, wherein the client component is further configured for:
determining that the query comprises a breakpoint, wherein the breakpoint is an intermediate point prior to executing the query wholly; and
executing the development environment script language code up to the breakpoint in the query, wherein the development environment script language code generates intermediate tables and intermediate results data based on sample data.

17. The system of claim 16, wherein the event processing compiler component is further configured for:
compiling the query, based on an intermediate table of the intermediate tables, using the event processing compiler, wherein compiling the query transforms the query in the event processing language code to the development environment script language code based on event processing attributes; and
communicating the query such that the query is executed as the development environment script language code from the breakpoint, wherein the development environment script language code generates final results data.

18. The system of claim 15, wherein the client component is further configured for:
providing the development environment which is a browser development environment having environment specifications comprising:
language specifications, input specifications, and output specifications, wherein the development environment supports an editor having a plurality of development environment assistance functionality comprising warnings, syntax and error highlighting, and intelligent code completion.

19. The system of claim 15, wherein the event processing compiler is configured for:
validating the event processing language code with the corresponding development environment script language code such that executing the query in the event processing language code in a production environment yields the same results as in the development environment.

* * * * *